T. ATTENDER.
Telescope.
No. 34,608.
Patented March 4, 1862.
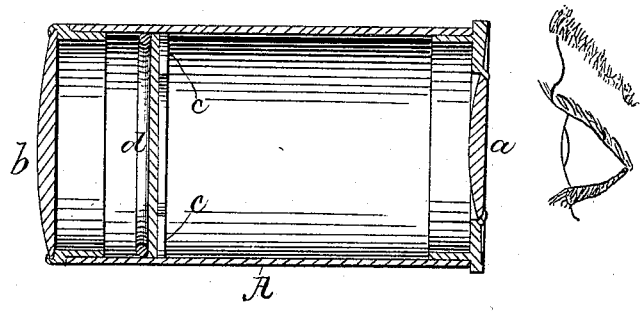
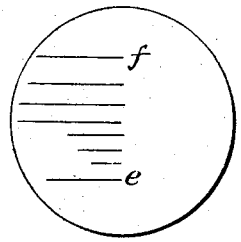
Witnesses
Charles E Foster
C. Howson
Inventor
T Allender
per Henry Howson
Atty

UNITED STATES PATENT OFFICE.

THEODORE ATTENEDER, OF PHILADELPHIA, PENNSYLVANIA, ASSIGNOR TO HIMSELF AND R. H. GRATZ, OF SAME PLACE.

IMPROVEMENT IN TELESCOPES FOR MEASURING DISTANCES.

Specification forming part of Letters Patent No. 34,608, dated March 4, 1862.

*To all whom it may concern:*

Be it known that I, THEODORE ATTENEDER, of Philadelphia, Pennsylvania, have invented an Improvement in Telescopes for Ascertaining Distances; and I do hereby declare the following to be a full, clear, and exact description of the same, reference being had to the accompanying drawings, and to the letters of reference marked thereon.

My invention consists in placing in the focus of the eye-lens of a telescope or spy-glass a plain disk of glass, on which is marked a scale so graduated as to enable the observer to ascertain the distance of an object of given dimensions.

In order to enable others skilled in the art to make and use my invention, I will now proceed to describe its construction and operation.

On reference to the accompanying drawings, which form a part of this specification, A, Figure 1, represents sufficient of the eye-piece of a telescope to illustrate my improvement, $a$ being the eye-lens, $b$ the concentrating-lens, and $c$ the diaphragm, to which a disk $d$ of plain glass of a uniform thickness is confined in any suitable manner. On the face of this glass disk are marked, by means of a diamond or by etching, a series of fine lines, Fig. 2, of which $e$ represents the base-line. In order to ascertain the distances between these lines, I place in the telescope at the same place where the disk $c$ has to be subsequently secured—namely, in the focus of the eye-lens—a temporary graduating glass, on the face of which is a scale consisting of a number of fine lines placed at a uniform distance from each other, there being about two hundred and fifty of these lines to an inch. I then place an object five feet six inches in height (that being the average height of a man) at a distance of, say, two hundred yards from the telescope. Then noticing how many divisions there are on the scale between the top and bottom of the object I ascertain the two extreme marks $e$ and $f$ to be made on the glass disk which has to be inserted in the place occupied by the glass scale.

When, on looking at a man through the telescope and causing the line $e$ to coincide with the soles of his feet, the line $f$ coincides with the top of his head, it is an indication that the man is two hundred yards from the eye of the observer. In like manner and by the same graduating-scale intermediate distances may be ascertained—such as those marked in Fig. 2, the lowest line $e$ being in all cases the base-line, which the observer must make to coincide with the feet of a man in ascertaining the different distances.

Having by the glass scale ascertained as many points illustrating as many distances as may be desirable, I make marks corresponding with these distances on the glass disk and place the latter in its proper position against the diaphragm, after which accurate distances may be ascertained by using the telescope.

It will be seen without further description that my improvement may be readily applied to any telescope or spy-glass, that it is cheap and simple as regards construction, and that the measurements must be always accurate owing to the permanency of the graduation.

I claim—

The use in telescopes, spy-glasses, &c., of a plain glass disk situated in the focus of the eye-lens, a scale being marked on the disk, and that scale so graduated as to enable the observer to ascertain the distance of an object of given dimensions.

In testimony whereof I have signed my name to this specification in the presence of two subscribing witnesses.

THEODORE ATTENEDER.

Witnesses:
 HENRY HOWSON,
 JOHN WHITE.